United States Patent [19]

King

[11] 4,203,120
[45] May 13, 1980

[54] RECORD DRIVE SYSTEM FOR ROTARY ELECTRICAL STYLUS DEVICE

[75] Inventor: Olin B. King, Huntsville, Ala.

[73] Assignee: SCI Systems, Inc., Huntsville, Ala.

[21] Appl. No.: 888,960

[22] Filed: Mar. 22, 1978

Related U.S. Application Data

[62] Division of Ser. No. 611,785, Sep. 9, 1975, Pat. No. 4,100,551.

[51] Int. Cl.² .......................................... G03G 17/00
[52] U.S. Cl. .................................................. 346/162
[58] Field of Search ............... 346/139 A, 139 C, 163, 346/162, 153

[56] References Cited

U.S. PATENT DOCUMENTS

| | | | |
|---|---|---|---|
| 1,825,551 | 9/1931 | Serrell | 346/163 |
| 2,910,339 | 10/1959 | Eisler | 346/139 A |
| 3,377,598 | 4/1968 | Borman | 346/162 |
| 3,678,193 | 7/1972 | Yamamoto | 346/139 A |

*Primary Examiner*—John H. Wolff

*Attorney, Agent, or Firm*—Curtis, Morris & Safford

[57] ABSTRACT

The device records images in the form of dots on electrical discharge-sensitive paper. Electrical styli are mounted on a rotor. This individual patent is directed specifically to the feature of the invention whereby the platen against which the styli press the paper during recording is a simple cylinder so that it serves both as a platen and a protective housing for the rotor and styli. The paper is fed continuously through a curved guide into the cylindrical platen. In another aspect of the invention, a timing disc bearing dot location indicia rotates with the rotor. Detectors and electrical circuitry are provided to supply one electrical timing pulse for every circumferential dot location. The dot placement and paper feed mechanism are synchronized with the rotation of the rotor so that the printer can operate at wide variety of speeds. A direct current drive motor is used to give high starting torque at low speeds, low size and cost, and to make the printer usable in portable battery-driven equipment.

6 Claims, 13 Drawing Figures

FIG. 5
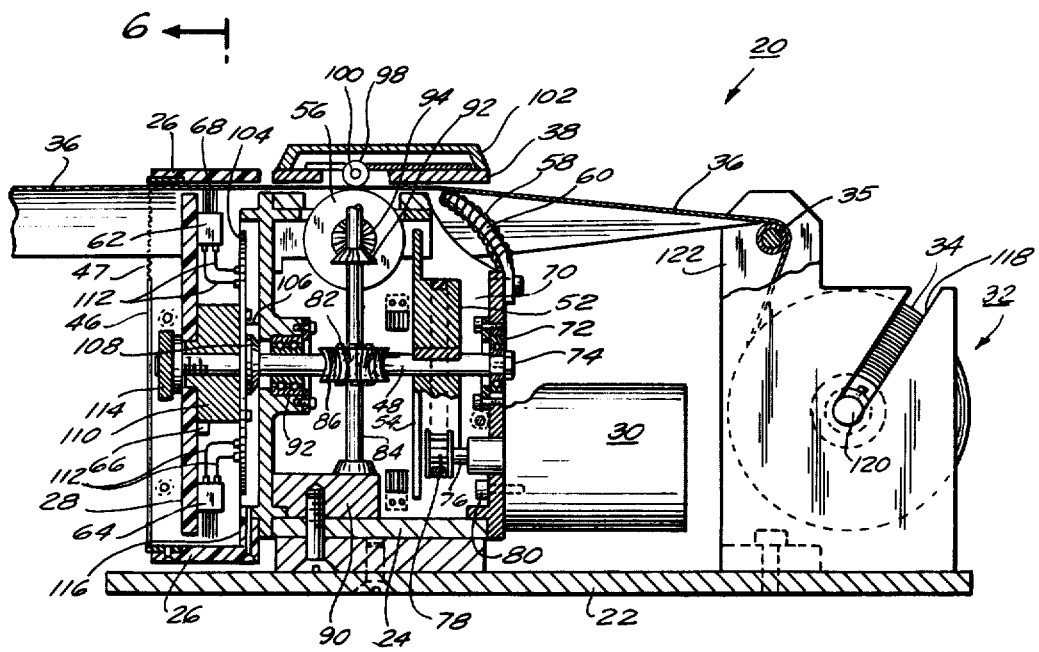
FIG. 10
FIG. 13
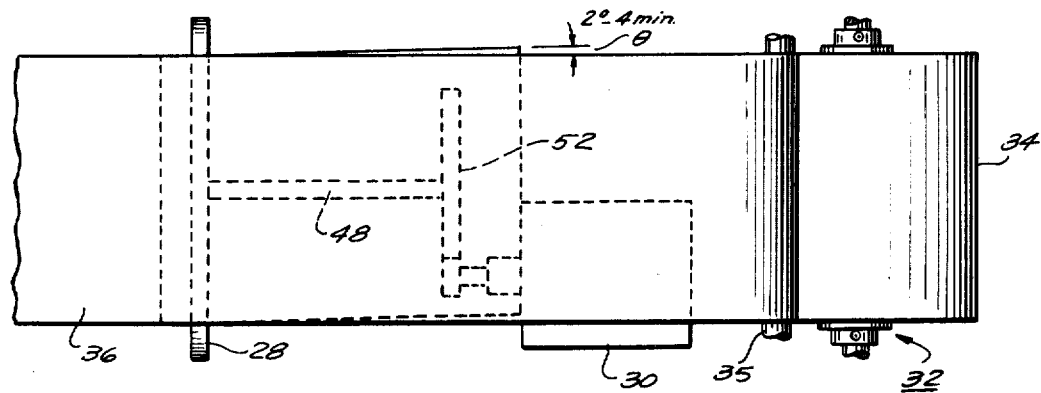

RECORD DRIVE SYSTEM FOR ROTARY ELECTRICAL STYLUS DEVICE

This is a division of U.S. application Ser. No. 611,785, filed Sept. 9, 1975 now U.S. Pat. No. 4,100,551.

This invention relates to image recording and printing, and particularly to rotary printing. In its preferred embodiment, the invention is disclosed in use in a rotary printer of the type in which images are formed by electrical discharges selectively positioned on discharge-sensitive paper.

As the speed of modern data-processing equipment has increased, so has the need for a high-speed, low-cost data printer. Very high-speed data printers have been developed. However, such printers usually are very complex and expensive. Much cheaper printers have been devised, but usually such printers are slow, and also are complicated. As a result, the cost of such printers, in terms of dollars per unit of printing speed (character per second), has been undesirably high. Furthermore, such prior printers have been unduly complicated and large. The maintenance costs have been relatively high, and the loss of operating time due to malfunction also has been undesirably large. Also, many prior printers are very noisy in operation.

In accordance with the foregoing, it is a major object of the present invention to provide a recorder or printer whose speed is relatively high and whose cost is low; a printer whose cost per unit of speed is very modest. Furthermore, it is an object to provide such a printer which is small, simple and reliable. Furthermore, it is an object to provide such a device which is relatively smooth and quiet in operation so that it does not disturb people when printing.

In accordance with the present invention, the foregoing objects are met by the provision of a rotary electrically-operated printer having a rotor and a plurality of electrically actuatable print members secured to the rotor. Drive means are provided for rotating the rotor to move the print members across a record surface.

Means are provided for producing electrical position signals indicating to the position of the rotor, and actuating means responsive to the position signals are provided for selectively electrically actuating each of the print members when the rotor is in a pre-determined position.

In accordance with one feature of the invention, means are provided for changing the position of the printing produced on the record surface by at least one of the print members, the changing means comprising means for changing the time separation between successive actuations of the print members. By this means, the relative positions of the printed images can be adjusted on the record member without movement of the print members on the rotor. This avoids the necessity for re-balancing the rotor and other adverse effects which might be caused by mechanical adjustment of the print members.

Preferably, the record surface has the form of a strip of electrical discharge-sensitive paper which is wrapped part-way around the rotor when making contact with the print members. It also is preferred that the paper strip be moved transversely across the rotor in a direction perpendicular to the plane of rotation of the rotor.

In accordance with another feature of the invention, characters are printed by forming them from dots produced by a plurality of styli arranged in axially-extending groups. Each print member or head includes one such group of styli. Preferably, there are enough styli in each of the groups to form a complete character with one pass across the recording surface. Thus, one pass of the rotor over the recording surface will print at least as many characters as there are print heads.

It is preferred that the characters be formed into words which extend longitudinally of the record strip, and that the strip be wide enough to accommodate a number of lines of text matter to be printed. Coded information representing the characters is stored in an electrical memory and then read out in a sequence such that each print head prints characters in vertical columns, the characters in each column being located in different lines of test matter. Thus, during each pass across the record strip, each head will print not just one character, but as many characters as there are lines of characters to be printed. In the preferred device, there are three such heads so that for each revolution of the rotor the number of characters which will be printed is equal to three times the number of lines of text. As a result, rather high printing speeds can be achieved with moderate rotor speeds.

It is also within the scope of the invention to print the words across the strip rather than longitudinally. In this case, the printing speed also will be relatively high.

In accordance with a further feature of the invention, the electrical position signals for indicating the position of the rotor are produced by indicia which rotate with the rotor and which are spaced apart by the desired spacing between dots in the printed images. Preferably, the indicia are opaque lines on a transparent disc mounted on the same shaft as the rotor.

A plurality of detectors is provided for detecting the indicia. It is desired that the number of detectors equal the number of recording heads. One of the detectors remains stationary, and the other two can be adjusted angularly around the disc to effectively alter the enabling and disabling of each of the three stylus heads without actually moving any of the heads. This permits adjustment of character alignment to compensate for uneven stylus wear and similar problems, without any mechanical adjustment of the heads on the rotor.

The memory which is used to store the character codes desirably is one into which data can be recirculated so as to repeat the printed text to make duplicate copies.

The paper strip preferably is fed continuously past the rotor at a speed which is directly proportional to the rotor speed. This ensures the same spacing between characters or lines (depending on which direction words are printed in) regardless of the rotor speed. This is accomplished compactly by gearing a paper feed roller to the same shaft as the one which drives the rotor.

The shaft is driven by a D.C. motor which has relatively high torque at low speeds, is relatively inexpensive, and which can be operated by batteries so as to make the printer portable.

The paper feed roller extends outwardly from a housing. A curved guide fits over the housing to guide the paper into a cylindrical sleeve which is used as a platen which supports the recording paper, and upon which the styli ride when not contacting the paper. The paper feed roller mates with an idler roller mounted in the guide, and pulls paper from a roll.

Paper from the roll passes over a guide bar which is located approximately in the plane of travel of the top of the arched paper through the printer. The guide bar is located so as to force the paper to bend through a substantial angle so that the point of delivery of the paper to the printer will remain approximately the same despite variations in the diameter of the paper roll. This prevents jamming and bunching of the paper.

Especially simple means are provided for electrically connecting the conductive portion of the paper to the return connection of the voltage supply. This should be provided in order to ensure electrical discharges between the styli and the paper. The simple grounding means comprises a helical spring on a curved rod. The spring is electrically conductive and is connected to ground. It is bowed into a shape so that it fits neatly against the concave surface of the paper as it passes through the printer. The spring also serves as a part of the guide structure which shapes the paper strip into an arc.

Because the speed of the paper feed, the timing disc and the rotor all are equal or directly proportional to one another at all times, the printer will operate accurately at a very wide range of speeds. In order to ensure that the blackness and readability of the printing is relatively uniform despite such speed variations, an automatic blackness control circuit is provided. The speed of the rotor is sensed, and the voltage applied to the styli is varied directly with the speed so that higher voltages are applied at higher speeds, and vice versa. This promotes relatively uniform blackness of the printed images.

The result of the foregoing features is a printer which meets the objects set forth above. That is, the printer is notably small, simple in construction and lightweight. Nonetheless, it is fast, relatively inexpensive and easy to maintain, and is quiet in operation.

The foregoing and other objects and advantages of the invention will be set forth in or apparent from the following description and drawings.

In the drawings:

FIG. 5 is a cross-sectional view taken along line 5—5 of FIG. 1;

Figure 11:
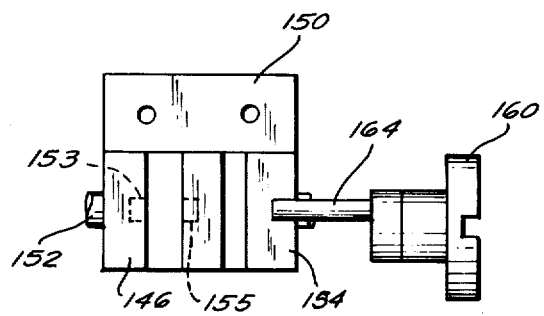
Figure 12:
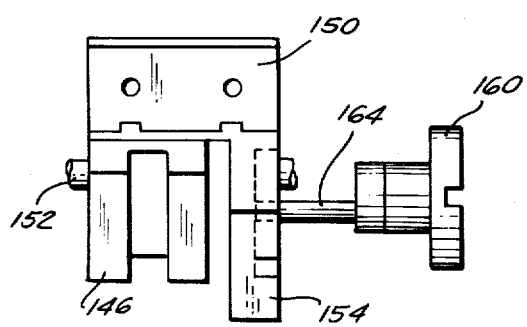
Figure 9:
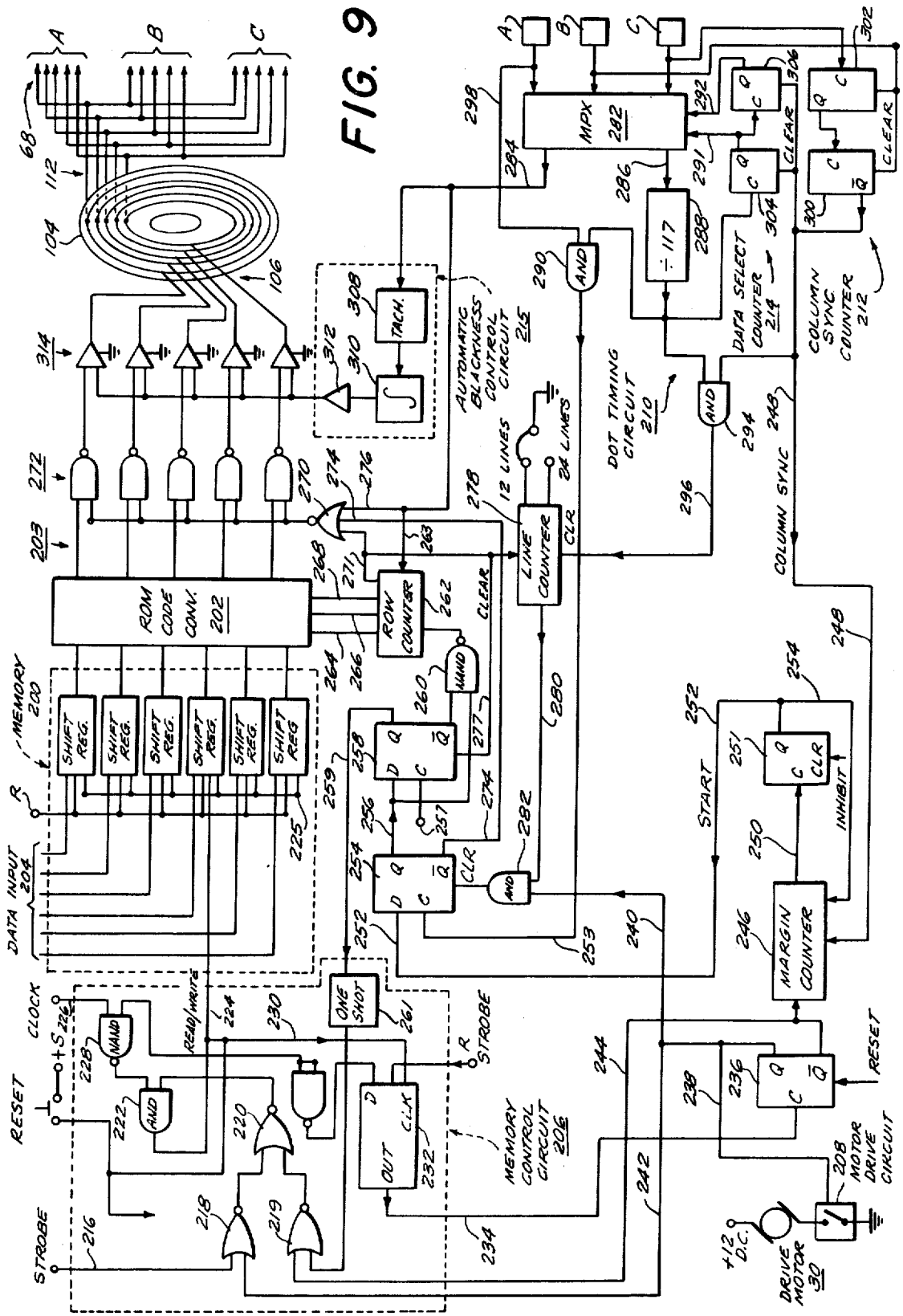

FIGS. 9 and 10 comprise the electrical control circuit of the printer shown in FIGS. 1 through 5;

FIGS. 11 and 12 are partially schematic elevation views of a component of the printer, with the component being shown in two different operating positions in the two figures; and FIG. 13 is a plan view, partially schematic, illustrating another embodiment of the invention.

GENERAL DESCRIPTION

Figure 1:
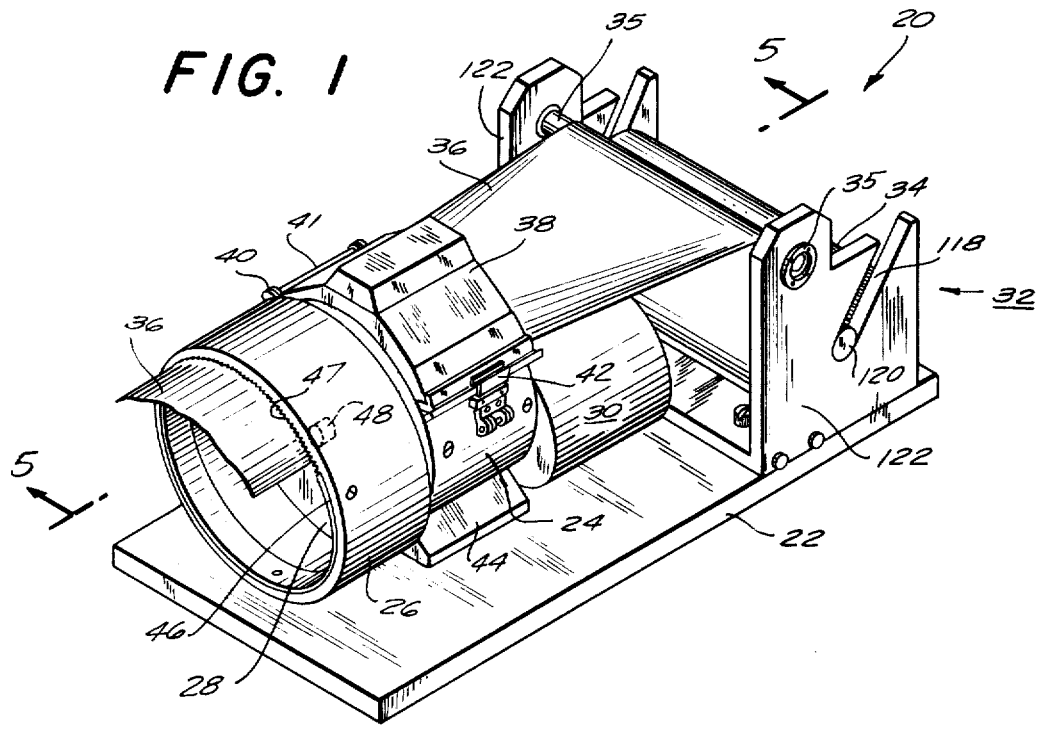
FIG. 1 is a front perspective view of a printer constructed in accordance with the present invention.
Figure 2:
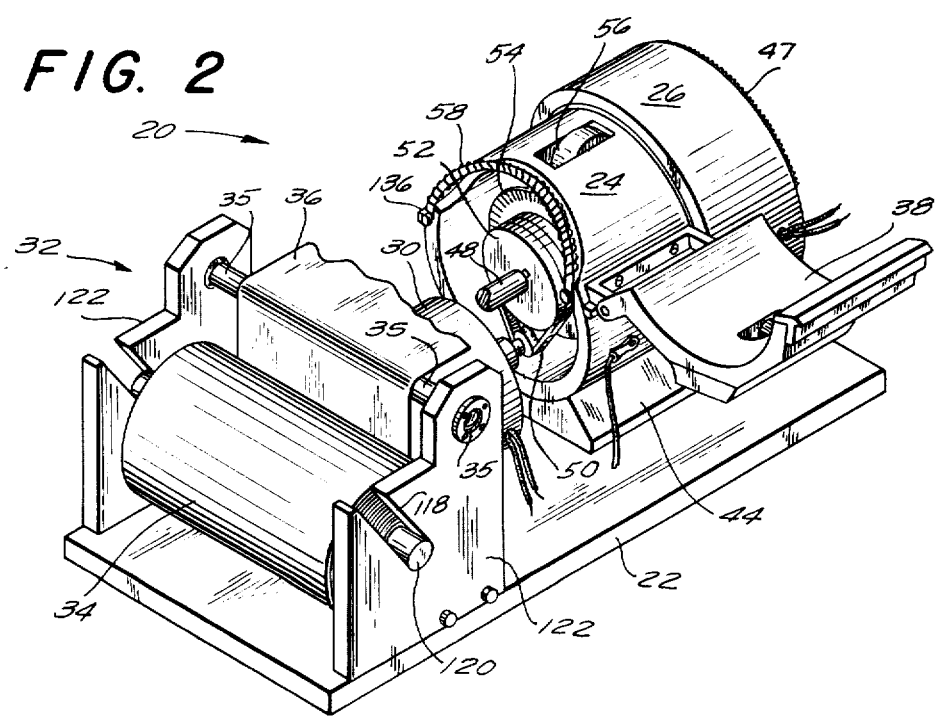
FIG. 2 is a rear perspective view of the printer shown in FIG. 1, with the paper guide raised, and with some of the paper removed.

FIGS. 1 and 2 show a preferred embodiment 20 of the printer constructed in accordance with the present invention. The printer 20 includes a base plate 22, a cylindrical housing 24, a cylindrical sleeve 26 which is used as a platen, a rotor 28 mounted on a shaft 48 so as to rotate in the sleeve 26, and a drive motor 30 for rotating the rotor 28. A timing disc 54 (FIG. 2) for timing the printing also is mounted on the shaft 48.

Electrical discharge-sensitive paper 36 is stored in a roll 34 contained in a dispenser 32. The paper 36 passes upwardly from the roll 34 over a straight guide bar 35 towards a curved paper guide 38. The guide 38 is hinged to the outer surface of the housing 24 at 40 so that it can be raised easily in the manner shown in FIG. 2. As it is shown in FIG. 1, a latch 42 holds the guide 38 down when the printer is in operation.

Referring to FIG. 2, a drive roller 56 is provided which pulls the paper from the roll 34, drawing it through the curved guide 38 so that the paper forms an arc, and feeds the paper through the sleeve 26 near its upper most inside surface. After the printing has been formed on the undersurface of the paper 36, the paper emerges from the left edge of the sleeve 26 as shown in FIG. 1. A paper tear ring 46 is provided at the left edge of the sleeve 26. The ring 46 has a serrated upper edge 47 to permit a length of the paper strip to be torn off easily.

The undersurface (that is, the concave surface) of the paper strip 36 is coated first with a dark material, and then with a light-colored material such as aluminum or zinc oxide which can be eroded or vaporized away by an electrical discharge or spark. The rotor 28 has three stylus heads 62, 64 and 66 each with five parallel equidistant axially-spaced styli 68 (see FIGS. 5 and 6).

As it will be explained in greater detail below, the paper feed roller 56 and the rotor 28 are driven continuously by the drive motor 30. The styli are selectively energized so as to form images on the underside of the paper by the formation of dots in a five dot by seven dot matrix.

Figure 3:
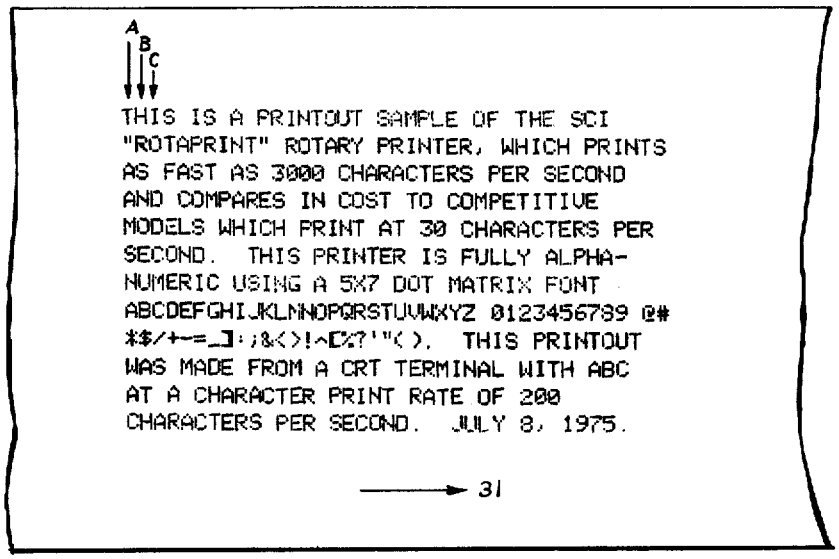
FIG. 3 shows a section of the paper recording strip used in the printer of FIG. 1 and bearing a reproduction of printing actually produced by the printer.

An example of printing produced by the printer 20 is shown in FIG. 3. Each stylus head has five wires, which is enough to produce all the dots for the horizontal portions of characters to be printed. Thus, each time one of the stylus heads passes over the recording paper, it will produce at least one printed character.

It is preferred that the words be printed on the strip as shown in FIG. 3; that is, in the longitudinal direction indicated by the arrow 31. Furthermore, when several lines of text are to be printed, the data is stored in a memory in the device and is read out so that each stylus head will print an entire vertical column of characters, one character from each of the lines. For example, the first column A of characters in FIG. 3 was printed by a single pass of a single stylus head; the column B was printed by a single pass of a second stylus head, and column C was printed by a single pass of a third stylus head. Since there are three stylus heads, three columns of characters are printed per revolution of the rotor. Thus, the number of characters per revolution which the device will print is equal to three times the number of lines being printed.

Of course, it also is possible to form words in a vertical direction instead of in the horizontal direction shown in FIG. 3. The speed capabilities of the printer when operating in such a mode are comparable with those in the other mode.

The printer 20 now will be described in detail.

DRIVE SYSTEM

Figure 4:
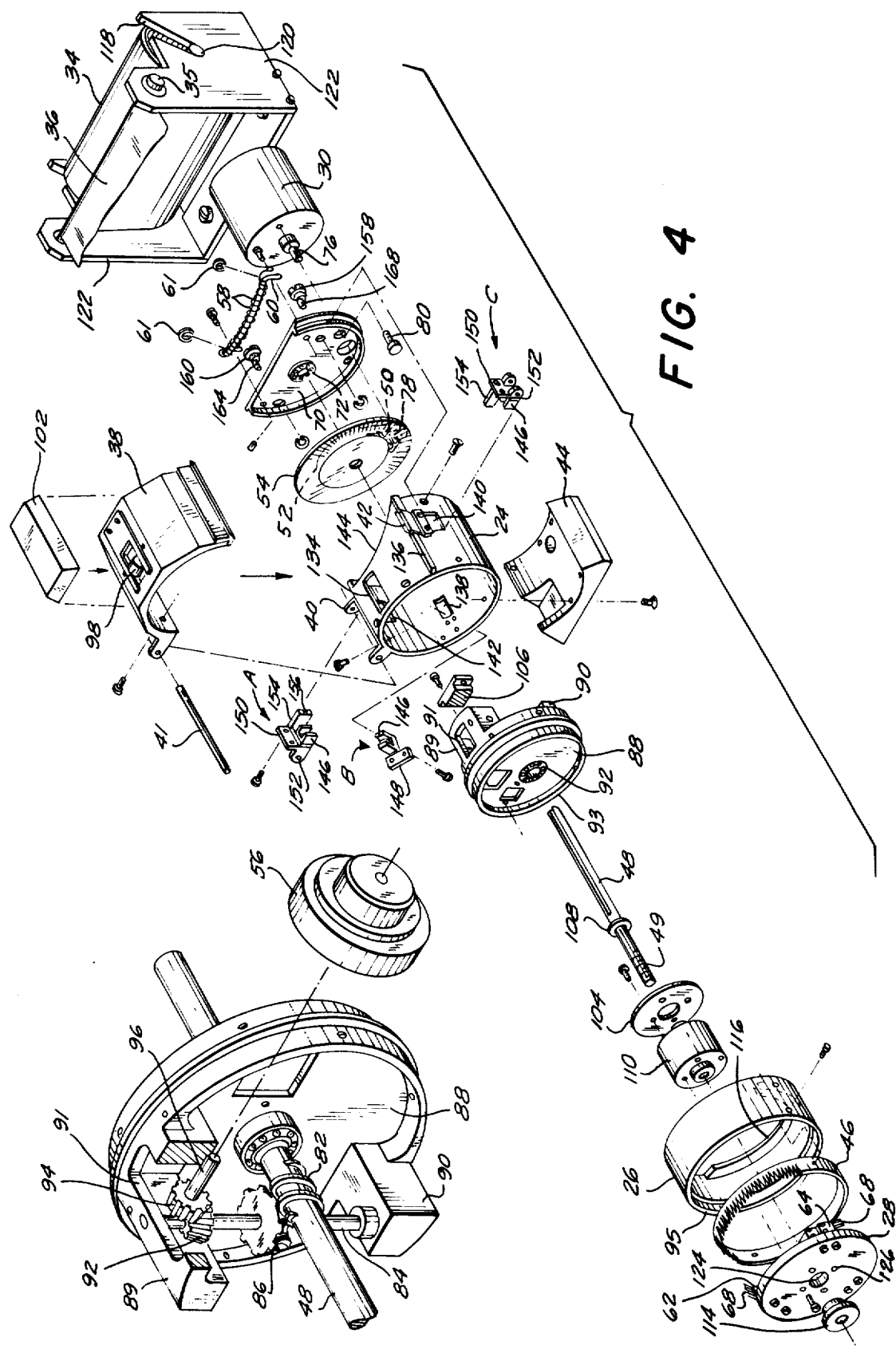
FIG. 4 is an exploded front perspective view of the printer shown in FIG. 1.

Now referring to FIGS. 4 and 5, the drive system of the printer 20 includes the shaft 48 and the drive motor 30, both of which already have been described. The motor 30 is mounted on an end plate 70 for the housing 24 by means of screws 80. To the output shaft 76 of the motor 30 is secured a toothed drive wheel 78 which drives a toothed-timing belt 50 (see FIGS. 2 and 4) to drive large toothed wheel 52 which is secured to the shaft 48. The sizes of the wheels 78 and 52 are such as to produce a speed reduction of four to one. The timing disc 54 is secured to the wheel 52 and thus is secured to the shaft 48.

The shaft 48 is mounted in ball bearings 72 in the end plate 70, and a retainer 74 is secured to the right end of the shaft. (See FIG. 5). Another end plate 88 is provided at the opposite end of the housing 24. The shaft rotates in ball bearings 92 in the end plate 88, and is retained by a retainer 108 secured to the shaft.

The rotor 28 is mounted on a spacer 110 (see FIG. 4 as well as FIG. 5) by means of screws, and the spacer is similarly attached at its other end to a slip-ring disc 104 which abuts against the retainer 108. The spacer, slip-ring, and rotor 128 are held against the retainer 108 by means of a threaded nut 114 which screws onto threads 49 (FIG. 4) on the left end of the shaft 48. Thus, the rotor 28, the spacer 110, the slip-ring disc 104, the gear wheel 52 and the timing disc 54 all rotate together at the same speed.

The rubber paper feed roller 56 is driven by gearing coupling it to the shaft 48. As it is shown in FIGS. 4 and 5, the roller 56 is rotatably mounted on a shaft 96 which is secured in an upper extension 89 (See FIG. 4) of the end plate 88. A slot 91 is provided through which the upper surface of the roller 56 extends.

A lower extension 90 of the end plate 88 forms the bearing support for a shaft 84 to which is secured a worm gear 86 which meshes with a worm 82 secured to the shaft 48. This combination drives a bevel gear 92 which meshes with another bevel gear 94 on the shaft 96 which drives the paper feed roller 56 at a speed substantially slower than that of the rotor 28.

The feed roller 56 mates with an idler roller 98 which is mounted on a shaft 100 in the curved paper guide 38. A cover 102 fits over the idler roller 100 to protect it.

As it can be seen in FIG. 5, the recording paper 36 is pinched tightly between the two rubber rollers 56 and 98 so that the rotation of the roller 56 will pull the paper through the printer substantially without any slippage.

PAPER GROUNDING MEANS

FIG. 10 shows schematically the electrical circuit formed when a spark is formed between a stylus 68 and the paper 36. The conductive under-surface 39 of the preferred recording paper must be connected to the return terminal of the voltage supply 69 which is connected to the stylus 68 in order to produce electrical discharges. Since that return terminal is grounded, the undersurface of the paper must be grounded.

This is accomplished by a means of a unique grounding device which is shown in FIGS. 2, 4 and 5. The grounding device consists of a helical conductive spring 58 which is wound around a curved metal rod 60 which is secured to the end plate 70 in the manner shown in FIG. 4 and which is connected to ground. The ends of the spring 58 are held in place by means of retaining rings 61.

As it is shown in FIG. 5, the rod 60 curves forwardly as well as into an arc so that it fits underneath the right edge of the cover 38. The upper portion of the coils of the spring resiliently press against the underside of the paper 36 and force it upwardly against the guide 38. The many coils of the spring provide numerous relatively closely spaced contacts to make good grounding contact with the undersurface of the paper.

This combination ground connection and paper tensioning means also serves a third function; that of helping to shape the paper into an arc so that it will pass easily through the guide 38.

PAPER DISPENSING

As it is shown in FIGS. 1, 2, 4 and 5, the paper roll 34 is stored on a spindle 120 whose ends fit into slots 118 in a pair of end plates 122 of the dispenser 32. The plates 122 are secured to the base plate 22 of the printer. The friction created by the various components of the dispenser tends to prevent over-run of the paper feed roll after paper feeding has stopped.

As it is most readily apparent in FIG. 5, the bar or roller 35 serves the function of causing the paper coming from the roll 34 to be bent through a substantial angle before passing on towards the printer. However, the bar always delivers the paper at approximately the same height of the printer, which would not be the case if the paper were pulled directly from the roll 34. Substantial movement of the dispensing point is undesirable in that it tends to cause bunching or wrinkling of the paper and thus prevents smooth feeding of the paper. Therefore, the dispenser 32 dispenses the paper strip to the printer uniformly and smoothly.

ROTOR CONSTRUCTION

Figure 6:
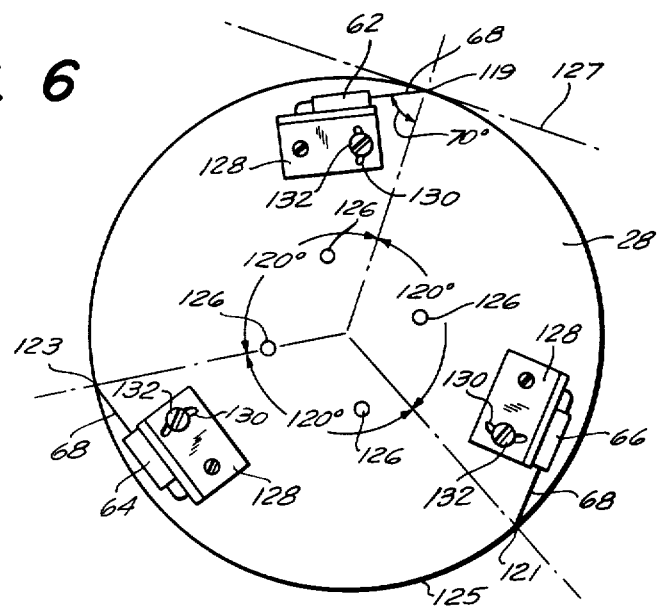
FIG. 6 is an elevation view of the rotor of the device of FIG. 1 taken in the direction of line 6—6 of FIG. 5.

FIG. 6 shows the construction of the rotor 28 and the positions of its three stylus heads 62, 64 and 66. FIG. 6 is a partially schematic view of the rotor 28, taken in the direction of line 6—6 of FIG. 5, with the spacer 110 and other elements omitted.

As it can be seen in FIG. 6, the points of contact between the styli 68 and the circle 125 which represents the internal surface of the platen sleeve 26, are indicated by reference numerals 119, 121, and 123. The styli 68 are mounted in a solid epoxy resin base which is secured to a bracket 128 which is mounted on the rotor 28. The bracket 128 has a curved slot 130 with a screw 132 to allow the stylus head to be moved outwardly or inwardly to increase or decrease the pressure of the styli on the platen or the paper on the platen.

As it can be seen in FIG. 6, the angle between the styli and the radius lines extending through the points 119, 121 and 123, is approximately 70°. The angle formed between the styli 68 and the tangent line 127 at point 119 therefore is 20°. Thus, the styli travel over the platen and the paper at an angle substantially less than perpendicular. This makes for smoother operation of the mechanism and reduces the likelihood of the styli tearing the paper when the styli cross over from the platen onto the edge of the paper.

Referring again to FIG. 5, it can be seen that the platen sleeve 26 is of a diameter substantially larger than that of the housing 24. This is necessary so that the paper 36 will enter the inside surface of the platen sleeve. The lower two-thirds 116 of the rear edge of the sleeve 26 is of a smaller diameter so that it will fit onto the flange 93 of the end plate 88 where it is fastened in place by means of three screws (not shown).

The paper tear ring 46 is fitted into a recess 95 in the inside surface of the front edge of sleeve 26.

As it also is apparent from FIG. 5, each of the stylus heads 62, 64 and 66 is connected to terminals at the rear of the slip-ring board 104 by means of wires 112 (also see FIG. 9). The terminals connect through the board 104 to the slip-rings on the other side of the board 104. It also should be noted that the stylus head 62 and 64 are shown in FIG. 5 rotated from their actual positions so that they can be illustrated more clearly.

DISCHARGE TIMING STRUCTURE

The timing of the formation of dots by the styli is important to the accurate printing of characters and other images. Referring now to FIGS. 2, 4, 5 and 7, this timing function is provided by means of the transparent disc 54 which has a series of thin opaque black lines 166 (FIG. 7) and a single wide black line 168 applied to the disc. Ideally, the three sensors A, B and C would be 120° apart from one another, as are the three stylus heads 62, 64 and 66. However, the construction of the housing 24 and the paper guide 38 does not permit this. Because of such constructional restraints, sensors A and C are placed 180° apart from one another, and sensors A and B are placed 60° apart. Sensor B is fixed in position. However, sensors A and C are movable circumferentially with respect to the disc 54 so as to adjust the timing of the start and stop of printing by the stylus heads relative to one another. This makes it relatively easy to make the initial head alignment, and also makes it possible to easily adjust for uneven wear of the styli and other causes of misalignment of the printing without moving the stylus heads. This avoids unbalancing the rotor and makes the adjustment process quite simple.

TIMING ADJUSTMENT

Figure 7:
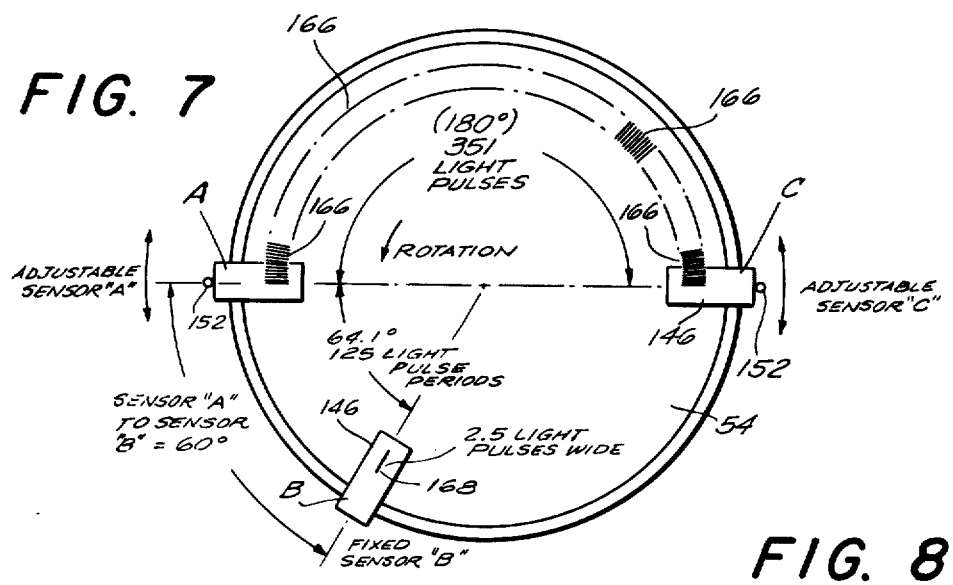
FIG. 7 is an elevation view of the timing disc of the device shown in FIGS. 1 through 5, and is partially schematic.

Referring to FIGS. 4, 11 and 12, as well as FIG. 7, sensor B, the fixed sensor, includes a detector structure 146 fastened to a mounting plate 148. The detector structure 146 includes a U-shaped housing, one arm of which includes a small light-emitting diode (LED) 153 (FIG. 11) which shines its light towards the other arm which contains a small photo-transistor 155 to detect the light. A mask (not shown) comprising a small piece of film which is opaque except for a small thin slit covers the photo-transistor so as to admit only that light which falls on the thin slit.

The detector 146 of sensor B is inserted through a hole 138 in the housing 24 and is secured in place after the disc 54 has been mounted in the housing. The two arms of detector 146 fit around the edge of the disc so that the light from the LED shines through the disc in the area where the markings 166 and 168 are located and is detected by the phototransistor.

Each of the other sensors A and C also includes an identical detector 146. The detector 146 in each sensor A and C is mounted on an L-shaped bracket 154 which is pivotably connected at 152 to a mounting bracket 150. The bracket 154 has a long arm with a longitudinal groove 156.

Still referring to FIGS. 4, 11 and 12, two adjustment cam devices 158 and 160 are provided. Each has a body which is fitted rotatably into a hole in the end plate 70 of the housing 24 and has a slotted head which permits the device to be turned with a screwdriver. Each device 158 and 160 also has an eccentrically-mounted pin 162 or 164. As it is shown in FIGS. 11 and 12, the pin 162 or 164 fits into the groove 156. As the head of the cam device 158 or 160 is rotated, the arm of the bracket 154 is raised upwardly or lowered about the pivot point 152 so as to change the location at which the detector senses the lines 166 and 168. The pivot points 152 are shown schematically in FIG. 7.

The detailed operation of the disc 54 and the sensors A, B and C in timing the printing of the printer will be explained in detail in connection with FIGS. 8 and 10. However, in general, each of the thin, closely-spaced lines 166 times the placement of one dot (or one row of up to five dots), and the wide pulse mark 168 serves as a reference mark. Very precise adjustments in the printing placements can be made by use of the cams 158 and 160 to move slightly the location of either or both of the sensors A and C relative to the sensor B so as to change the relative starting and stopping times for printing produced by the stylus heads.

ELECTRICAL CONTROL CIRCUITRY

FIG. 9 shows the electrical control circuit for the printer 20. The drive motor 30 is shown in the lower left hand corner of FIG. 9, and the styli 68 are shown in the upper right-hand corner of the drawing. The slip-ring disc 104, the brushes 106 contacting the slip-rings and the wires 112 leading from the slip-rings to the styli also are shown in the upper right hand corner. It is evident from FIG. 9 that each of the slip-rings is continuous so that each of the brushes 106 continuously is in contact with three styli, one from each of the three stylus heads.

The position of each such stylus is the same in each of the heads. That is, the outermost brush is connected to the first stylus in each head; the next brush to the second stylus, and so forth. This means that the styli in all three heads (labeled groups A, B and C in FIG. 9) are energized simultaneously. Therefore, the paper strip 36 should not extend more than one-third of the circumference of the platen 26. Otherwise, extraneous printing will be done on the strip. Of course, if the use of a wider strip is desired, then the styli can be energized selectively by means of segmented slip-rings.

D.C. is supplied throughout the control circuit by either a D.C. power supply, if 117 volts 60 $H_z$ power is the available source, or from a battery.

In the central upper portion of FIG. 9 is shown a memory 200 consisting of six 480 bit shift-registers. Connected to the output of memory 200 is an ROM code converter 202 commonly called a "character generator", which converts character identification signals from the memory 200 into corresponding dot matrix signals appearing on five output lines 203. The dot matrix signals are adapted to enable selected ones of the five styli which are in contact with the paper strip to be energized so as to form one row of dots in a particular character to be printed.

The code converter 202 is addressed by means of three input leads 264, 266 and 268 in order to produce on the output lines 203 successively the information to form seven successive rows of dots for a given character, thus enabling the printing of the character in $5 \times 7$ dot matrix form. This procedure will be described in greater detail below.

DATA ENTRY

The memory 200 has a capacity sufficient to store characters for twelve lines of text, each line being forty characters long. By the addition of more shift registers, the storage capacity of the memory 200 can be increased. With a paper strip width of four inches and characters approximately 3/16th inch high, and with minimum spacing between lines, up to twenty-four lines can be printed across the paper strip. The lines can be made about as long as one desires, if one is willing to add the necessary storage capacity to the memory. In fact, if the characters are printed in a single line, and if a "FIFO" memory is used instead of the memory 200, the line can have a virtually unlimited length.

Data is applied to the six input lines 204 to the memory 200. A memory control circuit 206 is provided for reading and writing to and from the memory 200. A high-frequency clock signal (e.g. 1 M H $_z$) is applied over input line 226 to one input of a NAND gate 228. Strobe pulses are applied, at a somewhat lower frequency, over another input line 216. The strobe pulses are delivered to one input of a gate 218. During data entry, a D-type flip-flop 236 (lower left-hand corner of FIG. 9) is in the reset condition in which a signal appears on output $\overline{Q}$ and none appears on the output Q. The "low" signal on Q enables gate 218 which delivers strobe pulses through another gate 220 and an AND gate 222 over a read/write line 224 to the memory 200. The strobe pulses cause data to be entered on the common data entry line 225 to the shift registers in the memory.

When the flip-flop 236 is reset, the $\overline{Q}$ signal from flip-flop 236 is applied over a line 244 to inhibit a gate 219 to prevent the reading of data through that gate.

Simultaneously with the read-in of data to the memory 200, the output of gate 222 is delivered over line 230 to the clock input of another shift register 232 which also has a storage capacity of 480 bits and is identical to the shift registers in the memory of 200. The shift register 232 is used as a detection device to detect when the memory 200 is full, and to signal the start of the printing operation.

START MOTOR

When the shift register 232 is full, it sends out an output signal over line 234 to the clock input of the flip-flop 236. This "sets" the flip-flop and creates a signal on the Q output line which is sent over line 238 to a motor drive circuit 208, which is a semi-conductor relay which completes the circuit to the drive motor 30 and starts it running.

The change of flip-flop 236 to the "set" condition enables gate 219 and thus makes it possible to read data out of the memory during printing, as it will be described below. Also, gate 218 is disabled by the signal on Q, so that data no longer can be written into the memory from the input lines 204.

SETTING THE END MARGIN ON THE RECORD STRIP

The operation of the flip-flop 236 also causes a change of state on its $\overline{Q}$ lead, and this actuates a margin counter circuit. A counter 246 counts two "column sync" signals representing two revolutions of the timing disc 54 (not shown in FIG. 9) before it permits the printer to start printing in order to provide a definite unprinted margin on the paper between the matter to be printed and the cut end of the paper strip.

COLUMN SYNC SIGNAL GENERATION

At the lower right-hand edge of FIG. 9 are shown the three sensors A, B and C shown in FIGS. 4 and 7 which detect the narrow timing marks 166 and the wide timing mark 168 on the spinning disc 54. Included in the detectors A, B and C shown in FIG. 9 may be amplifiers and Schmitt trigger circuits for the amplification and waveshaping of the pulses from the detectors.

Figure 8:
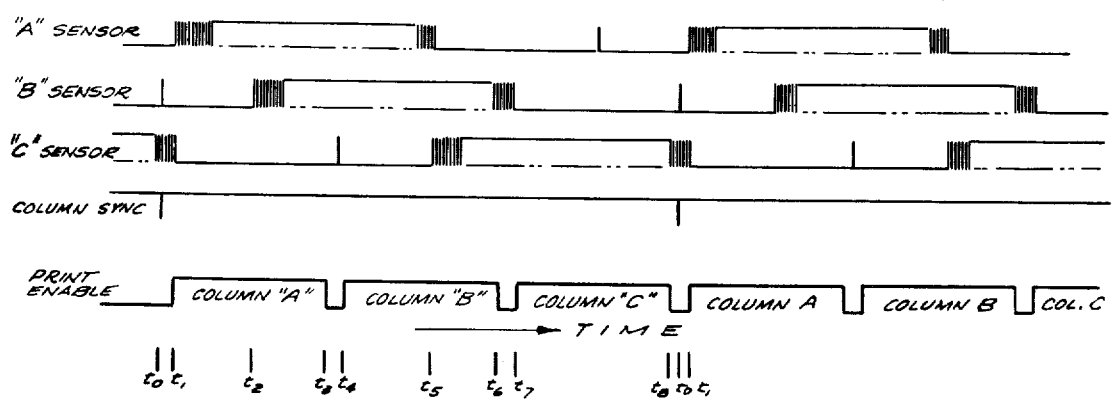
FIG. 8 is a set of waveform diagrams demonstrating the operation of the timing disc and associated electronic circuitry.

The "column sync" signals shown in the waveform diagrams of FIG. 8 are the ones that are counted by the margin counter. These signals are developed in the following manner. A column sync counter 212 is provided. It includes two J-K type flip-flops 300 and 302. Flip-flop 302 receives the signal from the C sensor on its clock input, and both flip-flops 300 and 302 receive the B sensor signal on their "clear" leads.

Referring now to FIG. 7 of the drawings, the disc 54 rotates counter-clockwise. The sensors A, B and C produce signals when a transparent portion of the disc 54 is between the LED and the photo-transistor, allowing light to reach the latter. Therefore, whenever a transparent area of the disc 54 is opposite the B sensor, the "clear" input leads of the flip-flops 302 and 300 are driven low so as to reset the column sync counter 212. When the wide mark 168 (2.5 times as wide as any of the marks 166) passes through the sensor B, this temporarily removes the "clear" signal from the flip-flops 300 and 302, and enables them to count pulses received from the sensor C, which now senses the narrow marks 166. Although it might seem that the thin marks 166 are ending at the time the wide mark 168 first is detected by sensor B, this is not so because the wide mark 168 is 64.1° from the forward end of the train of marks 166, whereas sensor B nominally is only 60° from sensor A. Therefore, sensor C then is 220° clockwise away from sensor B, and the end of the thin marks 166 is 224.1° away, and there still are several marks 166 left to pass through sensor C. Thus, the counter counts up to two before the wide pulse 168 ends and the counter again is cleared. This produces an output pulse on $\overline{Q}$ of flip-flop 300. This pulse is the "column sync" signal shown in FIG. 8 and appearing on line 248 of FIG. 9.

After the wide pulse passes sensor B, but before the thin lines reach sensor B, the counter remains cleared, and no "column sync" signal is produced. After the thin lines 166 reach sensor B, and also later when both sensors B and C sense the thin lines, the counter 212 is reset once for every transparent space between thin lines, and cannot, therefore, count to two and cannot produce a "column sync" signal. As a result, the "column sync" signal is produced only once per revolution of the disc 54, at the time when the wide mark 168 passes through sensor B.

As it has been noted above, the "column sync" signals are delivered over line 248 to the margin counter 246 which counts two of the signals. The counter 246 then delivers an output signal over line 250 to start the printing operation.

STARTING PRINTING

Referring to the lower central portion of FIG. 9, the signal on line 250 of the margin counter 246 is delivered to the clock input of another D-type flip-flop 251 which changes state and develops a signal on its Q output line. This signal is supplied over line 254 to the margin counter to inhibit it, and also is supplied over line 252 as a "start" signal to a print-enabling flip-flop 254.

Flip-flop 254 is a D-type flip-flop which is clocked by signals applied to its clock lead 253 from an AND gate 290 which is in the right-central portion of FIG. 9. AND gate 290 receives an enabling input on its lower lead, and is enabled by pulses from the A sensor received over line 298. This, in effect, sends the pulses from the A sensor through to the clock input of the flip-flop 254. Thus, the first of the pulses developed by the thin lines 166 on the code disc in the A sensor, together with the "start" signal on line 252, causes a change of state in the flip-flop 254. The subsequent clock pulses from the A sensor also time the later operation of the flip-flop 254. This operation of flip-flop 254 changes the state of the Q output line 256 and the $\overline{Q}$ output line 274. Simultaneously, the "high" signal on line 256 is applied to one input of another NAND gate 260 whose other input also is high due to being connected to the $\overline{Q}$ output of another D type flip-flop 258, which is "cleared" at this time.

ROW COUNTER

The output of gate 260 enables the row counter 262 whose function is to count the rows of dots being printed, as well as the spaces in-between lines of characters; to address the ROM code converter 202 over address lines 264, 266 and 268 and cause it to deliver its information through AND gates 272 and amplifiers 314 to the brushes 106 and then to the styli 68. Of course, none of the AND gates 272 will produce a proper output signal unless both of its inputs are in the same state.

One of the inputs of each of the gates 272 is connected to the output of a three-input positive NAND gate 270. The output of gate 270 enables each of the AND gates 272 when the signal on each of input leads (274 and 276) is in the proper state. The signal on line 274 is in the proper state whenever flip-flop 254 is "set" in order to enable printing. Lead 276 is connected to one output terminal 284 of a multiplexer circuit 282 (in the lower right hand portion of FIG. 9) which, as it will be explained further below, always receives the pulses produced by the thin lines 166 in the sensors A, B and C. Thus, the gate 270 is enabled repeatedly by the timing pulses produced by the thin lines 166, but only during the short duration of those pulses.

The timing pulses also are delivered from line 284 to the row counter 262 over a line 263. The row counter counts the time pulses and thus steps through its addressing routine and counts the number of rows being printed. Since there are seven dots vertically in each character, the row counter steps through seven pulses, repeatedly changing the combination of outputs on lines 264, 266 and 268 to sequentially address the ROM code converter 202.

On the eighth count line 271 of the row counter goes "high". This inhibits the gate 270 and sends an enabling signal over the "clear" line 277 to enable flip-flop 258. Flip-flop 258 does not actually change its state at this time because it is a "D" type device which requires a clock pulse on the clock input to enable it to change. The signal on line 271 also is sent to the line counter 278 to advance it by one count.

LINE SPACING SELECTION

The clock output line 257 of the flip-flop 258 actually can be connected to either line 264 or 268 in order to select the spacing between lines of characters. Line 264 is energized when the counter 262 counts up to two, and line 268 is energized when the counter 262 counts to five.

Assuming a line spacing of two has been selected by connecting line 257 to line 264, on the ninth count by the row counter 262, line 264 goes high, and this sets flip-flop 258. If a line spacing of five is selected, the same action takes place at a count of twelve instead of nine.

READING THE NEXT CHARACTER

When flip-flop 258 is set, its Q output goes high and delivers a signal to activate a one-shot multivibrator 261 in the memory control circuit 206 in the upper left portion of FIG. 9. The one-shot multi-vibrator produces a pulse which is delivered through gates 219, 220 and 222 to read/write line 224 to read out from memory 200 the information for another character. It should be noted that the information for the first character already appeared on the output leads of the memory 200 because that was the first information that was stored in the memory 200.

The setting of flip-flop 258 causes its $\overline{Q}$ output to go low, which causes the output of gate 260 to go high and reset all of the outputs of the row counter 262 to zero. The resulting low signal on lines 271 and 277 resets flip-flop 258 and again enables gate 270 to permit the next character to be printed.

The row counter 262 now starts anew to count timing pulses received over the line 263, and the printing of the next character in the column is started. The next character is printed in the same manner as the first character, and the process is repeated until a character has been printed in each of the twelve or twenty-four lines in which characters are to be printed. Thus one column of characters has been completed.

LINE COUNTER

The signal on output lead 271 from the row counter 262 also is delivered to a line counter 278 which counts the number of lines which have been printed in any pass of a print head over the record strip. Two different connections are provided to the line counter 278, one enabling the internal circuitry to count up to twelve lines, the other enabling it to count up to twenty-four lines, at the option of the user.

Assuming that twelve lines are to be printed, after the twelfth character has been printed by a particular print head, the line counter 278 delivers an output signal over line 280 to an AND gate 282 which also receives an input from flip-flop 236 over line 240 so that the flip-flop 254 now is cleared. This disables the printer until it is time to start the next vertical column of characters when the next print head is in position to start printing.

DOT TIMING

The dot timing circuit 210 includes, in addition to the multiplexer 282 and the column sync counter 212, a data select counter 214 and a divide-by-117 counter 288.

The multiplexer 282 connects different input signals to the output leads 284 and 286 depending upon the state of the input lines 291 and 292. The following table describes the operation of the multiplexer:

| | TRUTH TABLE FOR MULTIPLEXER 282 | | | | |
|---|---|---|---|---|---|
| | 291 | 292 | 284 | 286 | Function Permitted |
| (1) | 0 | 0 | A | B | Print Column A |

-continued

| TRUTH TABLE FOR MULTIPLEXER 282 | | | | |
|---|---|---|---|---|
| | 291 | 292 | 284 | 286 | Function Permitted |
| (2) | 1 | 0 | B | C | Print Column B |
| (3) | 0 | 1 | C | — | Print Column C<br>Column Sync Signal Resets<br>to Condition (1) |

The data select counter 214 includes a pair of J-K type flip-flops 304 and 306. When the first pulse from the divide-by-117 counter 288 changes the state of flip-flop 304, this changes the data at the output lines 284 and 286 in accordance with the above table. When the next pulse is received from the circuit 288, the state of the second flip-flop 306 is changed, and data on lines 284 and 286 change again in accordance with the table. In this way, first the A signals then the B signals and then the C signals are delivered to the circuit to control the printing.

Referring now to FIG. 8, the "column sync" signal occurs at time $t_o$, and the sensor timing signals start shortly thereafter, at time $t_1$. Referring now particularly to the "B" sensor waveform in FIG. 8, it can be seen that the B sensor starts producing timing pulses at time $t_2$. Referring again to FIG. 9, the pulses from sensor B are delivered over output lead 286 of the multiplexer to the divide-by-117 counter 288. Printing by the "A" stylus head ends at $t_3$ (FIG. 8) when the line counter clears the print-enable flip-flop 254. When the counter 288 has counted 117 pulses (one-third of the 351 pulses produced by the thin marks 166 on the disc) the counter 288 produces an output signal which is delivered to one input of an AND gate 294 whose other input is connected to the $\overline{Q}$ line of flip-flop 300. Thus, AND gate 294 is enabled and sends a signal over line 296 to clear the line counter 278. This removes the output from the line counter on line 280 and thereby disables AND gate 282 and causes the print-enable flip-flop 254 to change state and start the "B" print head to printing another column of characters. This occurs at time $t_4$, a short time after $t_3$.

From time $t_4$ to $t_6$, the "B" stylus head prints characters. At $t_6$, the line counter again operates to stop the printing. In the meantime, timing pulses from the "C" sensor have been delivered to the counter 288 since $t_5$. When counter 288 again produces an output after having counted 117 pulses from sensor C, the third stylus head is enabled to start printing at $t_7$, until the line counter stops the printing at $t_8$. Then the column sync pulse occurs again at $t_o$ and the printing process is repeated again for another revolution of the rotor 28. This is repeated over and over again until all of the information in the memory 200 has been read out and printed.

During the readout of information from the memory 200, the shift register 232 shifts the same number of times as each of the shift registers in the memory. When register 232 is full, a circuit (not shown) is provided which delivers a pulse over line 234 to return flip-flop 236 to its initial state, de-energize the motor drive circuit 208, and stop the motor. This same circuit also resets any of the shift registers or flip-flops which have not already been reset, in order to prepare the circuit for the next printing job.

REPEAT PRINTING

If it is desired to repeat the same printing job to make duplicate copies of the text, this can be accomplished simply as follows. Prior to loading the memory, the "R strobe" input to the shift register 232 and the "R" input to the shift registers in the memory 200 are connected together and to a low signal source. The shift registers are of a type in which this causes the data to be re-circulated and re-stored in the shift registers of the memory 200 instead of being destructively read out. The same is true for the shift registers 232. Thus, in this mode of operation, the printer automatically will print the same text matter again and again, as many times as desired.

AUTOMATIC BLACKNESS CONTROL CIRCUIT

In accordance with another feature of the invention an automatic blackness control circuit 215 is provided. This circuit comprises a one-shot multi-vibrator tachometer 308 whose output is delivered to an integrator circuit 310 whose output is amplified by a linear amplifier 312. The output of the amplifier 312 is delivered to the inputs of the amplifiers 314 in order to increase or decrease the voltage applied to the styli in accordance with the speed of the rotor.

The pulses delivered over line 284 have a frequency which is directly proportional to the rotor speed, since these are the fine pulses produced successively by the lines 166 in sensors A, B and C. The pulses at the output of the tachometer 308 have constant widths, since their widths are determined only be the characteristics of the multivibrator. However, since the time periods between the pulses varies with the speed of the rotor, the output of the integrator 310 varies in direct proportion to the rotor speed. This increases or decreases the output of the amplifier 312, and the amplifiers 314. As an example, in a preferred embodiment of the invention which has been built and successfully tested, the voltage applied to the styli was 50 at a printing speed of [from] 500 characters per second. At 3,000 characters per second and the same number of lines and line spacing, the stylus voltage was 70 volts.

By means of the automatic blackness control circuit, the blackness and readability of the printed characters is maintained at a relatively constant level despite such wide variations in speed of the rotor. As a demonstration example, highly satisfactory printing has been produced when the rotor is merely rotated by hand at a very low speed, as well as at speeds of up to 3,000 characters per second.

It should be understood that the speed of 3,000 characters per second is not believed to be the upper limit of speed for this device. This speed will vary with the number of lines of characters being printed, etc. However, it is a significant advantage of the invention that a speed of up to 3,000 characters per second has been achieved in a relatively low cost, simple and compact machine.

USES AND VARIATIONS

It is envisioned that the present invention will have wide utility in printing alphanumeric characters. For example, it is believed that this invention will be especially useful in producing "hard copy" from a cathode ray tube or television screen at a computer terminal or elsewhere. The "page" of data appearing at any one time on the cathode ray tube screen can be printed out as a unit rather easily. The printer of the present invention is so small (e.g. 4 inches by 4 inches by 8 inches or smaller) that it can be fitted into the same module with many cathode ray tube display screens.

The printer can be used advantageously in many applications where small size is important. For example, the printer is useful in aircraft, spacecraft, police, fire and other emergency vehicles.

It is believed that the printer of the present invention will make excellent low-cost, reliable stock quotation printer, especially when operated in the mode in which the printing is composed in a single line.

As one alternative embodiment of the invention, the logic circuitry of a computer terminal can be used to replace some of the control circuitry shown in FIG. 9. Alternatively, the printer control signals can be provided by specially programming a general purpose computer.

Although it is preferred that the electrical discharge process be used in the present invention, the three print heads on the rotor also can have other constructions. One is the use of a group of push-rods instead of styli for each of the heads. In such an embodiment, each of the push rods is actuated by an electro-magnet to strike an inked ribbon or the like in order to form characters in dot matrix form on ordinary paper. Devices forming dots from ink similarly can be used to form characters from dots on ordinary paper.

The number of print heads on the rotor can be varied, as can the number of styli in each head. However, the use of three print heads, with each printing one column of characters per pass, has been found to have decided advantages. It will be noted in FIG. 3 that there is a slight variation from left to right of the starting point of the top and bottom lines of print. This is because, as the rotor is rotating, the recording paper is continuously moving, which means that the positon at which the last line starts will be displaced longitudinally by a small amount from the place where the first line starts. It has been found, advantageously, that this slight amount of skew usually is not objectionable in data printers, and need not be compensated for. Howeverr, if it becomes objectionable in a particular use of the printer, the skew can be compensated in the manner shown in FIG. 13.

FIG. 13 is a schematic plan view of a printer like that shown in the previous figure of the drawings, except that the direction of paper feed is at an angle $\theta$ of 2 degrees and 4 minutes from the longitudinal axis of the printer, an angle which is sufficient to compensate for the skew produced by the printer. Of course, if variations in the number of heads and/or stylus wires are made, the compensation angle $\theta$ can be varied as necessary.

Although a mechanical system has been described for alignment of the printing by the three heads, one in which the adjustment is made by turning the cam wheels 158 and 160, the same adjustment can be made by purely electronic means. In this modification, the same function can be performed by the adjustment of counters which time the start of printing by each of the heads so as to cause the printing by that head to lead or lag the printing of the others by a certain amount. With present technology, however, it is believed that the mechanical adjustment described above gives good precision at a lower cost than it would require to obtain the same precision by electronic means.

MATERIALS AND SPECIFICATIONS

Following are specifications for some of the materials and components of a printer which has been constructed and successfully tested in accordance with the present invention.

Suitable recording paper is readily available. Suitable papers, coated with a black opaque material and then coated with either aluminum or zinc oxide, have been obtained from Fitchberg C.P.I, Scranton, Pennsylvania, and from AtlanTol Industries. The preferred paper has a total thickness of 0.002 inch. The aluminum-coated paper is desirable because is often requires lower stylus voltages in order to vaporize the aluminum coating to expose the black material underneath.

Styli which have been used successfully have a diameter of 0.007 inch, and are spaced approximately 0.016 inch from one another, center-line to center-line. The desired spacing of the dots on the paper is approximately 0.016 inch, both in the horizontal and in the vertical direction. It should be noted, however, that sometimes there is a small vertical extension of the dots due to the rotation of the rotor. When printing characters, this sometimes improves the printing in that it tends to fuse the dots together into solid vertical lines.

The material of the styli is thoriated tungsten. The most desired range of angles between the styli and the platen is 60° to 70° (see FIG. 6).

It is preferred that as much of the body of the printer as possible be molded out of plastic in order to achieve low cost and light weight. Thus, although the main drive shaft 48 is made of metal, the housing 24 and many other parts are molded out of reinforced plastic.

The platen 26 preferably is molded out of glass-filled "Lexan" polycarbonate plastic material, or out of glass-filled nylon. Such materials are preferred for the platen because it must be electrically non-conductive, and yet must have good wear characteristics.

A D.C. motor which has been found to be suitable for driving the printer is manufactured by Barber-Coleman Co., part number FYOM-63200-51. It has a diameter of 1.26 inches and a length of 1.95 inches. Its operating voltage is 12 volts D.C. and has a torque output of 1 ounce-inch and 1.3 Amperes.

The optical sensors 146 used to sense the marks on the timing disc 54 are made by Optron Corporation. The sensor is called an "optical switch", part number OBP800. Also suitable is a similar device made by Spectronic, Part. No. PNSPX 1872-s. The sensor has been modified simply by adding a mask as described above in the specification.

The code used to encode characters is the well-known code called ASCII. This is advantageous since code converters for use with such a code are readily available.

In the electrical control circuit of FIG. 9, certain of the components will be identified specifically below. The components are readily available from several different sources unless it is indicated otherwise.

| COMPONENT | IDENTIFICATION |
| --- | --- |
| Rom Code Converter 202 | 2512 "Character Generator" Manufactured by Signetics Corp. operates on ASCII II code |
| Shift registers in Memory 200 and Shift Register 232 | Integrated circuit shift register 2529, with data recirculation feature. |
| "Flip-Flops" 236, 251, 254, 258, | Integrated circuit D type (flip-flops) bi-stable multivibrators. |
| "Flip-Flops" 300, 302, 304 and 306 | 74LS73 J-K type integrated circuit (flip-flops) bi-stable multivibrators. |
| Multiplexer 282 | Integrated circuit multiplexer type 74153. |

| COMPONENT | IDENTIFICATION |
|---|---|
| Row counter 262 | Integrated circuit 4 bit-counter connected as a divide-by-16 circuit |
| Margin space counter 246 | 74LS90 integrated circuit counter connected as a divide-by-2 circuit. |
| Line counter 278 | 74LS190 integrated circuit counter with 74LS74 flip-flop connected at the input as a divide-by-2 circuit. |
| Gate 270 | Number 7427 integrated circuit plus NOR gate. |
| Integrator 310 | A741 operational differential amplifier with capacity feedback. |
| One-shot tachometer 308 | An integrated circuit 74LS121 one-shot multivibrator |
| AND gates 272 | Integrated circuit No7403 NAND gates |
| Gates 222, 282, 294, 290 | Integrated circuit 74LS08 AND gates |
| Counter 288 | Two 74LS193 integrated circuit counters connected as a divide-by 117 circuit |
| OR Gates 218, 219 and 220 | 74LS02 integrated circuit NOR gates |

The above description of the invention is intended to be illustrative and not limiting. Various changes or modifications in the embodiments described may occur to those skilled in the art and these can be made without departing from the spirit or scope of the invention.

I claim:

1. A rotary electrical character printing device including a rotor, a plurality of styli secured to said rotor, drive means for turning said rotor, record sheet material feed means coupled to said drive means for feeding a strip of said material past said rotor, with the styli contacting said material, at a speed which is directly proportional to the speed of said rotor, means for electrically energizing each of said styli to form dots on said record material, said drive means including a direct-current electrical drive motor, position indicating means driven by said motor in synchronism with said rotor and including a plurality of periodically-spaced indicia for each of said characters for producing sequential electrical signals upon the detection of corresponding associated indicia, thereby ensuring synchronization between each one of said indicia and an associated one of said dots, and control means utilizing said signals to control the timing of the energizing of said styli, whereby the spacing of dots within each character is substantially independent of the speed of said motor.

2. A device as in claim 1 in which said drive means includes a drive shaft driven by said motor, said rotor being directly mounted on said shaft, and gear means for coupling said feed means to said shaft.

3. A rotary electrical device comprising, in combination, a substantially cylindrical platen, a rotor, a plurality of styli mounted on said rotor, means for rotatably mounting said rotor within said platen with said styli contacting the internal surface of said platen when said device is in operation, an arcuate guide for guiding a record sheet into said platen in arcuate form, drive means for rotating said rotor and feeding said record sheet into said platen in contact with said internal surface, means for making the speed of movement of said sheet a direct function of the rotor speed, said platen also comprising a housing around said rotor, said rotor being mounted eccentrically with respect to said platen so that said styli contact said tube over only a portion of its inner surface.

4. A device as in claim 3 including a spindle for holding a roll of record sheet material, said feed means including friction drive roller means located between said spindle and said platen and closely adjacent said rotor, at a point where said record sheet has an arcuate form.

5. A device as in claim 3 in which said drive means includes a direct current motor coupled to rotate said rotor and geared to drive said feed means, position indicating means for producing an electrical signal upon the detection of each dot location position of said rotor, and control means utilizing said signals to control the timing of the energizing of said styli to synchronize the formation of each dot with the rotation of said rotor and the feeding of said record sheet.

6. A device as in claim 3, said platen comprising a cylindrical tube made of electrically insulating material and forming a smooth platen surface on its inside wall, said styli being inclined at an angle of substantially less than 45° with respect to said inside wall at the points of contact of said styli with said wall.

* * * * *